(12) United States Patent
Hufnagel et al.

(10) Patent No.: US 9,128,594 B1
(45) Date of Patent: Sep. 8, 2015

(54) TOUCH INTERFACES AND CONTROLS FOR AVIATION DISPLAYS

(75) Inventors: Bruce D. Hufnagel, Marion, IA (US); Matthew J. Carrico, Mount Vernon, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 118 days.

(21) Appl. No.: 13/224,992

(22) Filed: Sep. 2, 2011

(51) Int. Cl.
*G06F 3/041* (2006.01)
*G06F 3/0484* (2013.01)

(52) U.S. Cl.
CPC .................................. *G06F 3/04845* (2013.01)

(58) Field of Classification Search
USPC ................ 345/173–179; 178/18.01; 200/512; 342/33; 701/16
See application file for complete search history.

(56) References Cited

U.S. PATENT DOCUMENTS

| | | |
|---|---|---|
| 6,441,773 B1 | 8/2002 | Kelly et al. |
| 6,448,922 B1 | 9/2002 | Kelly |
| 6,650,275 B1 | 11/2003 | Kelly et al. |
| 6,977,608 B1 | 12/2005 | Anderson et al. |
| 7,109,912 B1 | 9/2006 | Paramore et al. |
| 7,109,913 B1 | 9/2006 | Paramore et al. |
| 7,161,525 B1 | 1/2007 | Finley et al. |
| 7,242,343 B1 | 7/2007 | Woodell |
| 7,292,178 B1 | 11/2007 | Woodell et al. |
| 7,307,576 B1 | 12/2007 | Koenigs |
| 7,307,577 B1 | 12/2007 | Kronfeld et al. |
| 7,372,394 B1 | 5/2008 | Woodell et al. |
| 7,379,014 B1 | 5/2008 | Woodell et al. |
| 7,417,578 B1 | 8/2008 | Woodell et al. |
| 7,417,579 B1 | 8/2008 | Woodell |
| 7,486,220 B1 | 2/2009 | Kronfeld et al. |
| 7,492,304 B1 | 2/2009 | Woodell et al. |
| 7,492,305 B1 | 2/2009 | Woodell et al. |
| 7,515,087 B1 | 4/2009 | Woodell et al. |
| 7,515,088 B1 | 4/2009 | Woodell et al. |
| 7,528,765 B1 | 5/2009 | Woodell et al. |
| 7,541,970 B1 | 6/2009 | Godfrey et al. |
| 7,541,971 B1 | 6/2009 | Woodell et al. |
| 7,557,735 B1 | 7/2009 | Woodell et al. |
| 7,576,680 B1 | 8/2009 | Woodell |
| 7,633,428 B1 | 12/2009 | McCusker et al. |
| 7,633,430 B1 | 12/2009 | Wichgers et al. |
| 7,693,621 B1 * | 4/2010 | Chamas .......................... 701/16 |
| 7,696,921 B1 | 4/2010 | Finley et al. |
| 7,714,767 B1 | 5/2010 | Kronfeld et al. |
| 7,733,264 B1 | 6/2010 | Woodell et al. |
| 7,859,448 B1 | 12/2010 | Woodell et al. |
| 7,859,449 B1 | 12/2010 | Woodell et al. |
| 7,868,811 B1 | 1/2011 | Woodell et al. |
| 7,872,594 B1 | 1/2011 | Vesel |

(Continued)

OTHER PUBLICATIONS

U.S. Appl. No. 12/284,909, filed Sep. 26, 2008, Gribble et al.

(Continued)

*Primary Examiner* — Kenneth B Lee, Jr.
(74) *Attorney, Agent, or Firm* — Angel N. Gerdzhikov; Donna P. Suchy; Daniel M. Barbieri

(57) ABSTRACT

An apparatus for controlling an aviation display is provided. The apparatus includes processing electronics configured to cause the aviation display to switch, in response to a user input, a first format for aviation data and a second format for aviation data. The first format includes a full format image of live data and the second format includes a scaled representation of the live data.

19 Claims, 10 Drawing Sheets

(56) References Cited

U.S. PATENT DOCUMENTS

| | | | |
|---|---|---|---|
| 7,889,117 B1 | 2/2011 | Woodell et al. | |
| 7,889,118 B1 | 2/2011 | Finley et al. | |
| 7,965,225 B1 | 6/2011 | Dickerson et al. | |
| 8,072,368 B1 | 12/2011 | Woodell | |
| 8,077,078 B1 | 12/2011 | Woodell | |
| 8,633,913 B1 | 1/2014 | Raghu et al. | |
| 2006/0244636 A1* | 11/2006 | Rye et al. | 340/945 |
| 2007/0279253 A1* | 12/2007 | Priest | 340/963 |
| 2009/0046075 A1* | 2/2009 | Kim et al. | 345/173 |

OTHER PUBLICATIONS

G5000, Garmin, printed from website https://buy.garmin.com/shop/shop.do?cID=153&pID=90821&ra=true on Apr. 20, 2011, 2 pages.

G3000, Garmin, printed from website https://buy.garmin.com/shop/shop.do?cID=153&pID=66916 on Jun. 28, 2011, 2 pages.

G2000, Garmin, printed from website https://buy.garmin.com/shop/shop.do?cID=153&pID=97668 on Jun. 28, 2011, 2 pages.

U.S. Appl. No. 13/250,798, filed Sep. 30, 2011, Jinkins.

U.S. Appl. No. 13/250,307, filed Sep. 30, 2011, Jinkins.

Office Action on U.S. Appl. No. 14/107,916 mail date Feb. 4, 2014, 12 pages.

Final Office Action on U.S. Appl. No. 14/107,916 Dated Aug. 7, 2014, 12 pages.

Notice of Allowance for U.S. Appl. No. 13/743,182, mail date Sep. 24, 2013, 6 pages.

Notice of Allowance on U.S. Appl. No. 14/107,916 Dated Nov. 4, 2014, 10 pages.

\* cited by examiner

TOUCH INTERFACES AND CONTROLS FOR AVIATION DISPLAYS

BACKGROUND

The present disclosure relates generally to the field of aviation display systems. The present disclosure more specifically relates to the field controlling an aviation display.

As technology improves, aviation displays are becoming more interactive. Interaction with aviation displays typically includes controlling a cursor through the use of buttons and/or knobs. Buttons, knobs, and the accompanying control panels consume valuable real estate on a crowded flight deck. Furthermore, cursor interaction with the displayed information is an indirect interaction with the displayed information. That is, the user performs a tracking exercise to move the cursor to the desired information as opposed to directly interacting with the information displayed. Typical current aviation display systems have limited ability to rapidly customize information displayed according to the task at hand, which restricts a user's ability to process the large quantities of real-time data provided by state of the art avionics systems. There exists a need for improved aviation display controls systems.

SUMMARY

One embodiment relates to an apparatus for controlling an aviation display including processing electronics configured to cause the aviation display to switch, in response to a user input, a first format for aviation data and a second format for aviation data. The first format includes a full format image of live data and the second format includes a scaled representation of the live data.

Another embodiment relates to a method of controlling an aviation display. The method includes causing a first display to provide an icon symbolic of live data, causing the first display to provide a scaled representation of the live data in response to a first user input, and causing a second display to provide a full format image of the live data in response to a second user input.

Another embodiment relates to a method of controlling an aviation display system including a touchscreen and a forward display. The method includes causing the touchscreen to provide an icon symbolic of information and causing the forward display to provide the information in response to a touchscreen gesture in relation to the icon.

DETAILED DESCRIPTION

Figure 1:
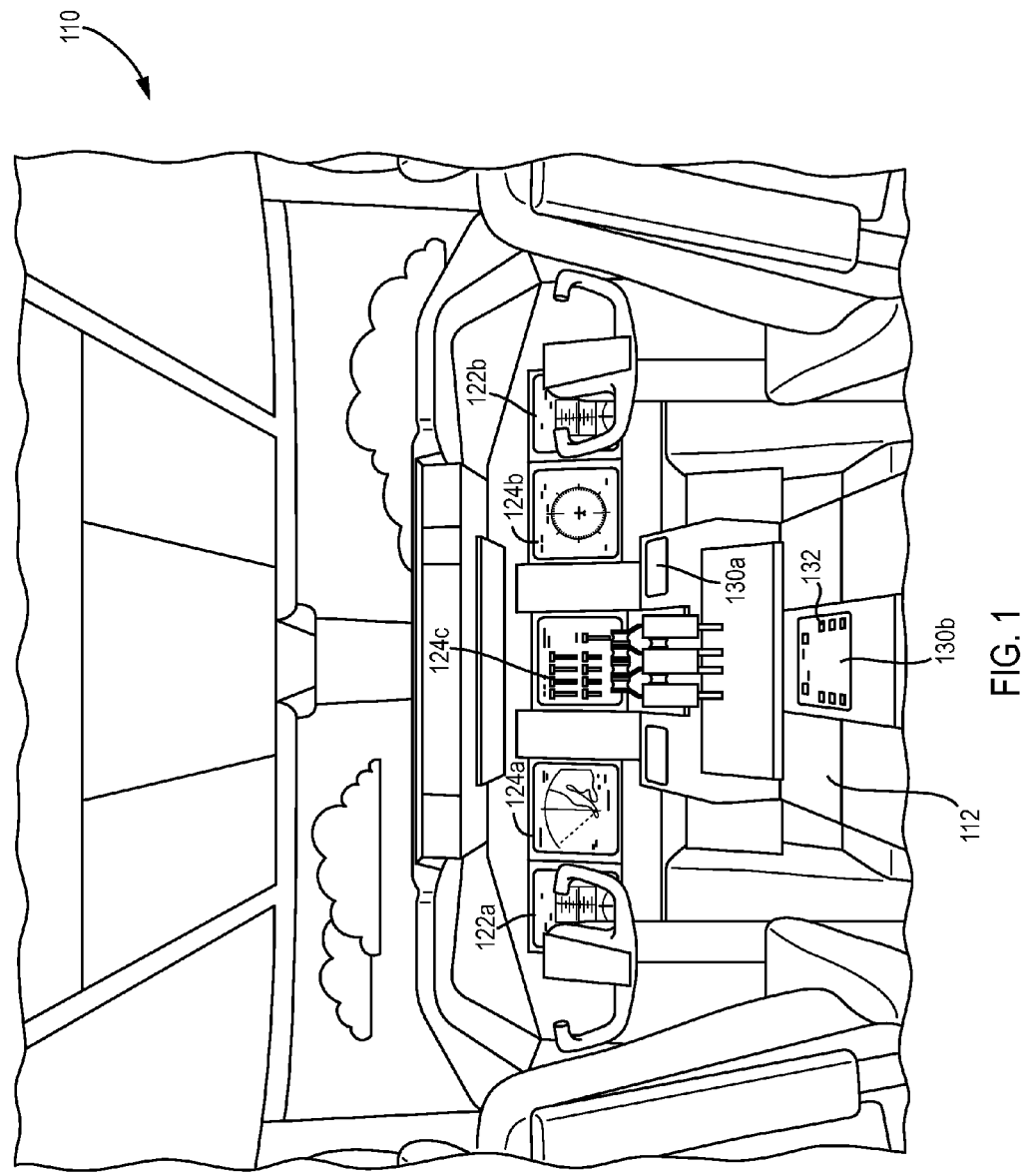
FIG. 1 is a perspective view schematic illustration of an aircraft control center, according to an exemplary embodiment.

Referring generally to the Figures, an apparatus and methods for controlling an aviation display are described. In a modern aircraft control center (i.e., flight deck or cockpit), large quantities of information provided from avionics system to the pilot or copilot. Most of this information is provided through forward displays which are readily in view of the pilot and copilot when facing forward. The primary flight display (PFD) is usually located directly in front of the pilot or copilot and provides primary flight information, such as, altitude, airspeed, and heading. The multi-function display (MFD) are typically located to one side or another of the PFD and typically provide navigation, weather, and system information. This information is usually provided in a standard, certified format.

Under normal flight conditions, providing information in the standard orientation and arrangement of gauges may be sufficient. However, it is often desirable to rearrange or manipulate the presentation of data according to the task at hand. Furthermore, it may be desirable to quickly view real-time or live data, but without requiring the presentation of such data to occupy a large portion of the display. For example, it may be desirable to have real-time topographical maps or charts available, but due to conditions, weather radar occupies most of the forward display. Similarly, it may be desirable to monitor real-time diagnostic information (e.g., engine temperature, oil pressure, etc.), but not desirable to displace the information displayed on the PFD or MFD. Accordingly, an aviation display control system is described which allows a user to switch between a full-format image (e.g., the certified format displayed on a PFD, MFD, electronic flight bag (EFB), head-up display (HUD), etc.) of live data and a scaled-representation (e.g., miniaturized version, enlarged version, subset of information, etc.) of the live data. According to various embodiments, the user may then interact with and manipulate the scaled-representation of the live data. According to other embodiments, the user may switch between full-format images of live data or scaled-representations of the live data and an icon symbolic of live data.

The current state of the art flight deck user interface is typically based on direct controls and cursor control devices. This type of user interface dissociates the information being manipulated on the screen from the physical control action used to activate a button or move the cursor. That is, using a cursor becomes a tracking exercise and may distract the user from the task at hand. Providing a touchscreen as part of the human machine interface enables a user to directly interact with the information being manipulated, which reduces workload, reduces training, and enhances safety. According to various embodiments, touchscreen gestures may enable a user to interact with icons, avatars (e.g., scaled-representations of live data), or full-format images of live data. According to other embodiments, touchscreen gestures enable the user to move representations of live data between screens in the aircraft control center.

An avatar is a scaled representation of the actual format and screen. Avatars presented on a touch display can represent several PFD, MFD, EFB, and head-up display formats. For example, an avatar may display primary flight display, Synthetic Vision System, topographical map, chart, airport map, Integrated Control Display Unit, radio tuning, Engine Indicating and Crew Alert System, checklist, and synoptics information. Avatars can display scaled versions of their representative formats real-time, or live. The real-time, or live, data may have a delay or latency depending on the particular system and the refresh rate of data received; however, the data is live in the sense that is being updated whenever new data is received. Content on the PFDs, MFDs, and EFBs can be chosen from a variety of avatars on the touch interface displays by flicking or dragging them into slots representing the flight deck's actual display layout. One avatar may be dragged over another to replace it and automatically displace the previous avatar back into a selection area. One avatar may be dragged over another to add information to the underlying display, for example, adding a weather overlay to a chart.

Avatars are different from icons in that avatars represent live, scaled-down information, whereas icons are a symbolic representation of the live data. Avatars and icons may swap status. That is, an avatar may become an icon, and an icon may become an avatar. Icons and avatars may have various sizes depending on screen size and resolution, and may be adjusted in size to compensate for distance from the viewer or the viewer's visual acuity. Avatars are typically larger in size than icons and smaller than full format images. For example, according to various embodiments, icons may have dimensions of 32 pixels×32 pixels, 48 pixels×48 pixels, 6 mm×9 mm, 13 mm×13 mm, etc. According to other embodiments, avatars may have dimensions of 64 pixels×128 pixels, 192 pixels×96 pixels; 128 pixels×256 pixels; 256 pixels×256 pixels, 40 mm×55 mm, 75 mm×50 mm, 75 mm×100 mm, etc. It is contemplated that an avatar may be scaled down to the size of an icon, scaled up to the size of a full format image on a forward display, or scaled to any size in between. Depending on screen size and resolution, an avatar may be scaled larger than the full format image on the forward display. It is further contemplated that an avatar may be scaled to a size smaller than an icon.

Any format may be selected for manipulation in the touch display interface, including formats currently on display in any of the other flight deck displays. The format desired for manipulation can expand from icon or avatar status to fill most of the touch display screen for manipulation of the content. Pinch and stretch actions can zoom on certain portions of any particular format. Once zoomed in, a drag operation can be performed to pan across the format or image. Formats may consist of interactive objects that can be selected for direct manipulation. Objects can be identified visually by a halo or other indicator. Interaction with formats or various objects can be echoed on another display, such as an MFD, to aid in interaction without requiring the crew to focus all attention upon the touch display. The echo may not only include actions on the format or object, but a representation of the crew's finger input location, thereby effectively producing a cursor identifiable as a touch input. The echo may be selectively placed on any forward display. For example, a copilot may place and manipulate relevant information on the captain's forward display.

It should be noted, that the interfaces described herein may be used to monitor and/or control aircraft systems. For example, the described interface may be used to view and interact with information relating to weather radar, synoptics, checklists, the electrical system, the hydraulic system, and other avionics and/or on-board systems. For further example, the interface may be used to control the radio, cabin pressure, the radar, the hydraulic system, the electrical system, etc. According to one embodiment, a touchscreen may be used to control on-board systems beyond the display being touched.

Referring to FIG. 1, an illustration of an aircraft control center or cockpit or flight deck 110 is shown, according to an exemplary embodiment. Aircraft control center 110 is shown to include a central pedestal 112, one or more touchscreens 130, and a plurality of flight deck displays. The flight deck displays include one or more forward displays, shown as primary flight displays (PFD) 122 and multi-function displays (MFD) 124. First and second PFDs, shown as left PFD 122a and right PFD 122b, are typically located directly in front of the pilot and copilot and display primary flight information, for example, airspeed, altitude, altitude, heading, vertical speed, and turn coordination. First and second MFDs, shown as left MFD 124a and right MFD 124b, are typically located to one side or another of the PFD and provide navigation, weather, and system information. An MFD may be displayed on a single display along with PFD information, or the MFD may be a separate display adjacent to a PFD or on the central pedestal 112, for example central MFD 124c.

Touchscreen 130 includes a touch sensitive surface and a display. The touch sensitive surface may be integrated into the display as an overlay or bezel, for example. Touchscreens may be implemented on forward displays, a central pedestal display (shown as first central pedestal display 130a and second central pedestal display 130b), a small tray table display, or any multipurpose display in the flight deck 110 or cabin that can accommodate a touchscreen. In some aircraft, for example in business and regional services aircraft and other small aircraft, PFD 122 and MFD 124 may be easily reachable by a pilot or copilot. Accordingly, PFD 122 and/or MFD 124 may be touchscreens which can be directly interacted with by the crew. The central pedestal display 130 provides the benefit of preventing the crew from smudging the PFDs 122 or MFDs 124 with fingerprints, and the touch interface is conveniently located within reach during adverse conditions. The tray table display (not shown) may be a small display or folded multiple displays disposed on a tray table in an outboard armrest or a pocket under the side window. Using a tray table display prevents smudging of the forward displays and keeps the touch interface within easy reach without interfering with any flight operations or other controls. For example, the tray table may be positioned across a user's lap. Touchscreen 130 provides signal output to the aviation display control system. Any single or multi-touch technology will support the concepts described herein; however, some user interface techniques may require a multi-touch screen.

Conventional user interface methods, for example, cursor control devices 132 (e.g., buttons, switches, knobs, dials, etc.) or other direct controls, may be retained for use as an alternative to the touch interface in the event no hands are free or the operating environment does not allow for fine motor control. For example, cursor control devices 132, may be used in turbulence, other conditions when the touchscreen is less effective, or as a backup user interface control in event of a loss of the touchscreen. Likewise, the touchscreen 130 may also act as a cursor control device in benign environments. According to one embodiment, a bezel button or a larger switch can reassign the display format layout to an approved standard, thereby instantly reverting all formats to a default condition and layout. The switch should be easy to reach and use during adverse conditions but not able to be accidentally actuated when using the touch display. A large button with high activation force might be considered.

Figure 2A:
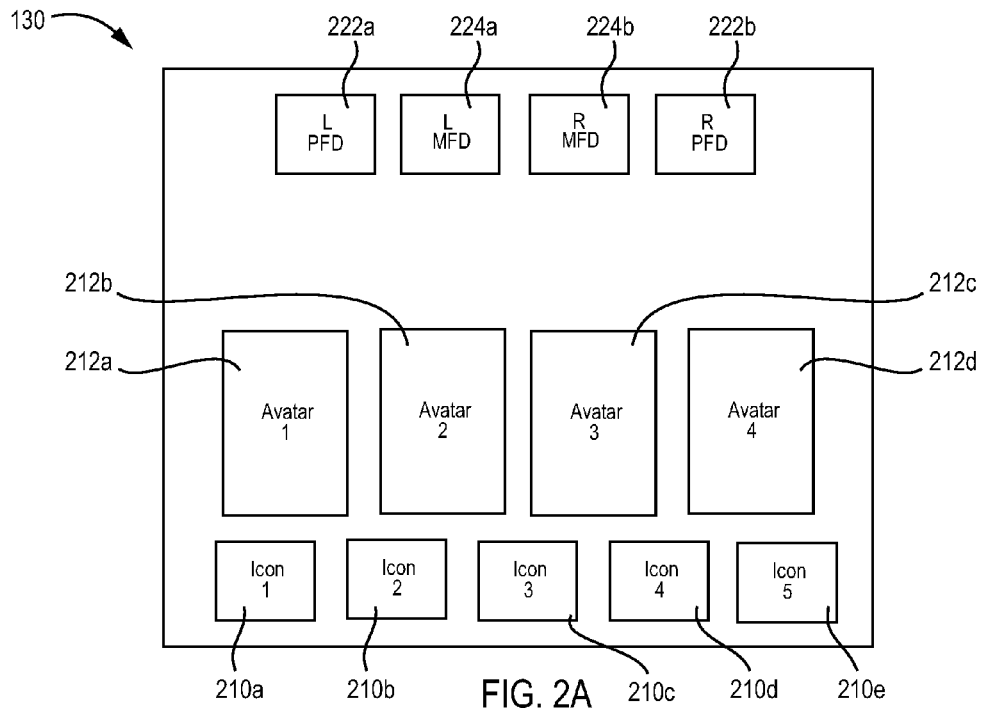
FIG. 2A is a schematic illustration of an aviation display interface, according to an exemplary embodiment.
Figure 2B:
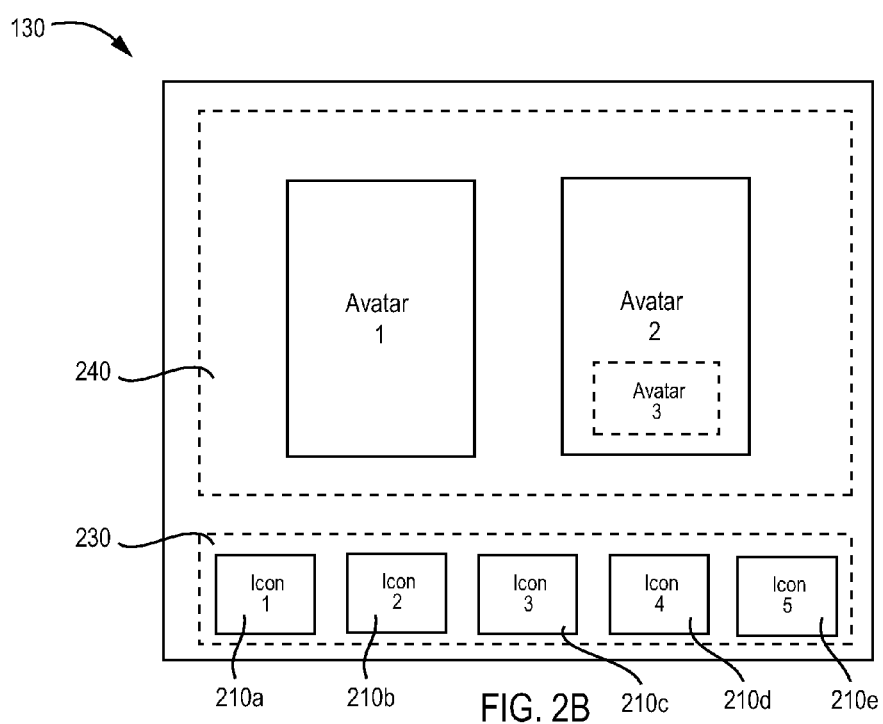
FIG. 2B is a schematic illustration of an aviation display interface, according to another exemplary embodiment.
Figure 2C:
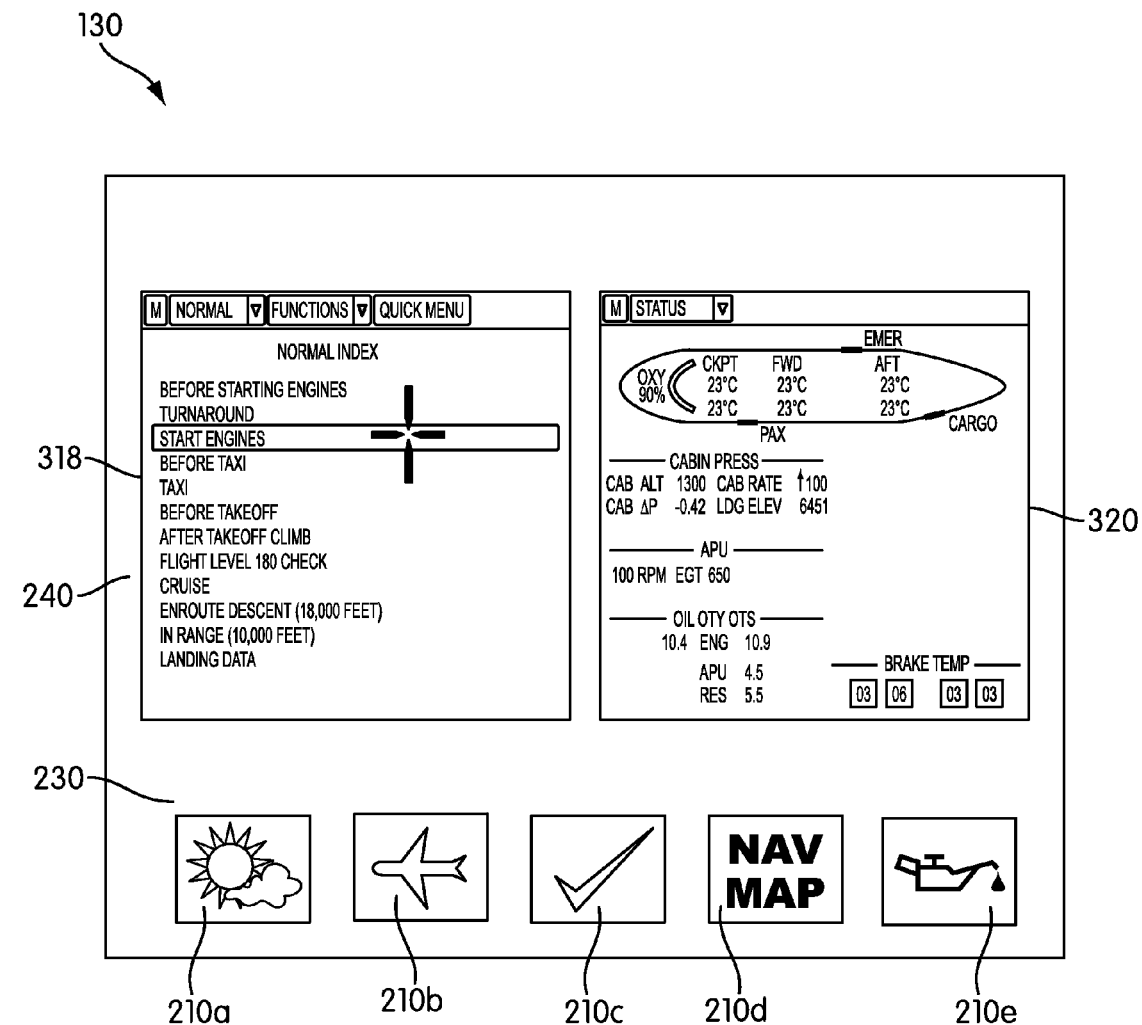
FIG. 2C is an illustration of the aviation display interface of FIG. 2B, according to an exemplary embodiment.

Referring to FIGS. 2A, 2B, and 2C, illustrations of aviation display interfaces are shown, according to exemplary embodiments. Specifically, FIGS. 2A and 2B schematically illustrate the interface shown on touchscreen 130, according to various embodiments. As shown in FIG. 2A, touchscreen 130 includes one or more locations (e.g., areas, portions, positions, slots, etc.), shown as icon locations 210, avatar locations 212, and forward display locations. The forward display locations represent or correspond to PFDs 122 and MFDs 124, e.g., left PFD display location 222a corresponds to left PFD 122a, left MFD location 224a corresponds to left MFD 124a, right MFD location 224b corresponds to right MFD 124b, and right PFD location 222b corresponds to right PFD 122b. As shown, the forward display locations are oriented respective to each other as the forward displays are oriented respective to each other on flight deck 110. According to the embodiment shown in FIG. 2B, touchscreen 130 may not include PFD locations 222 or MFD locations 224 and may include an icon region 230 and an avatar region 240.

The icon locations 210, e.g., icon location 210a, icon location 210b, etc., and icon region 230 are configured to display icons. Icons are a symbolic representation of the aviation data. The symbolic representation may be a memorable symbol that allows a user to associate in information with the icon, but does not necessarily mimic the full format information. For example, a sun disk or sun-and-cloud symbol may be used to represent weather information. According to another example, a silhouette of an aircraft may represent system information (e.g., mechanical, electrical, or hydraulic system information). According to one embodiment, icons may flash, change shape, and/or change color in response to changing information. For example, the silhouette of an aircraft icon may become a flashing red thermometer in response to an engine overheating.

Figure 3A:
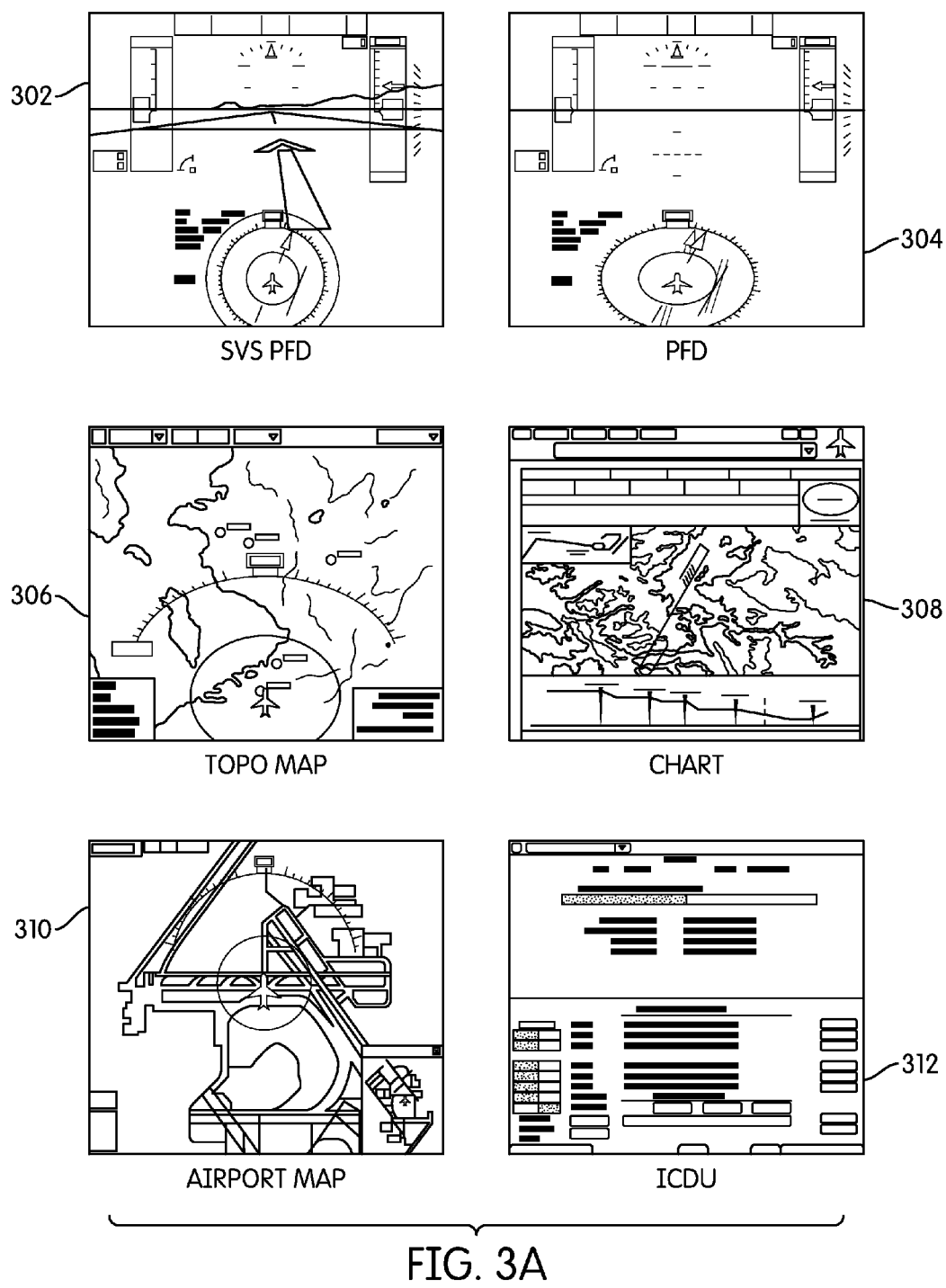
FIG. 3A is an illustration of sample avatars, according to an exemplary embodiment.
Figure 3B:
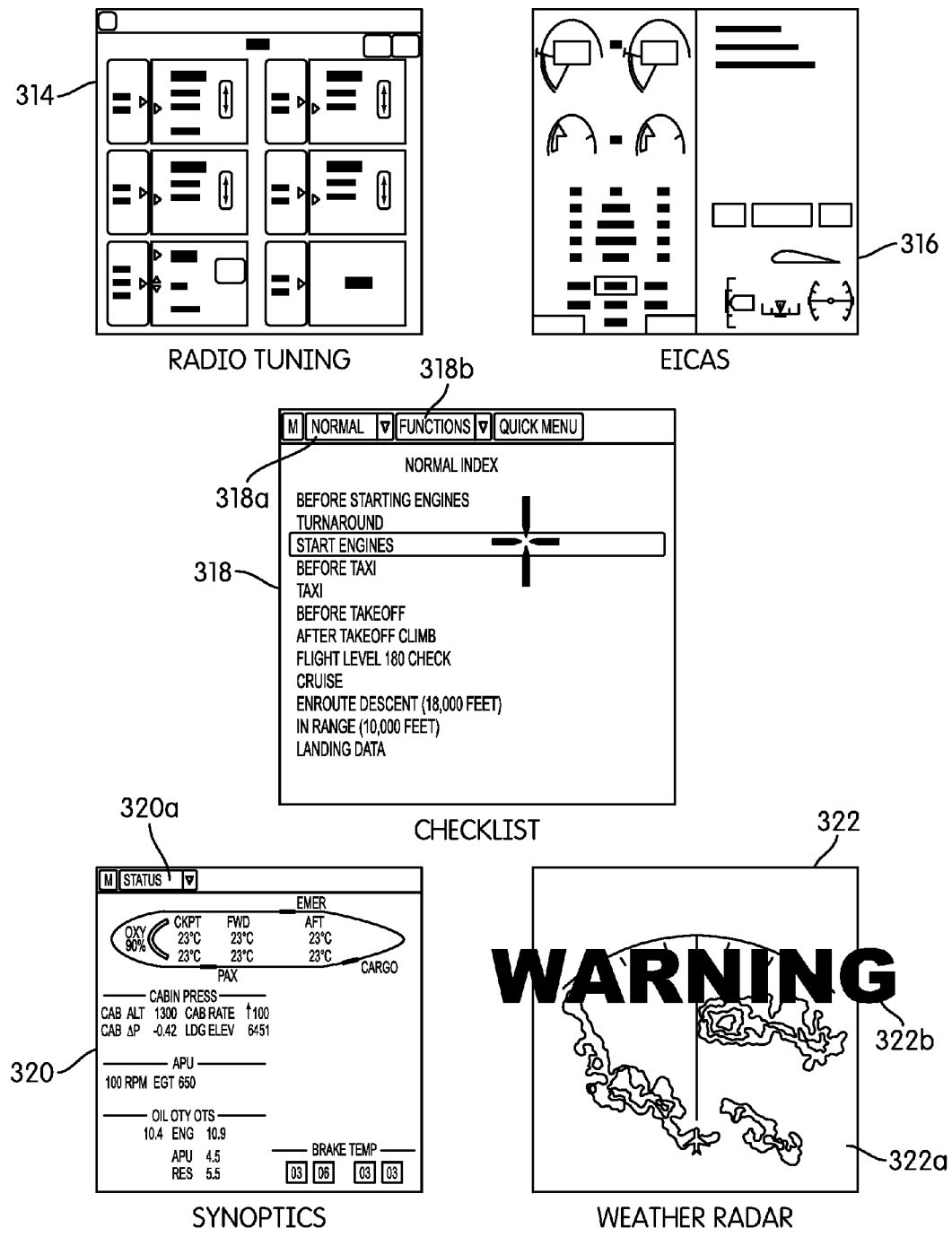
FIG. 3B is another illustration of sample avatars, according to an exemplary embodiment.

Avatar locations 212, e.g., avatar location 212a, avatar location 212b, etc., and avatar region 240 are configured to display avatars. Referring to FIGS. 3A and 3B, a plurality of avatars are shown according to exemplary embodiments. Avatars are a scaled representation of the actual formats and screens (e.g., the certified format displayed on a PFD 122, MFD 124, or EFB). For example, an avatar may display Synthetic Vision System 302, primary flight display 304, topographical map 306, chart 308, airport map 310, Integrated Control Display Unit (ICDU) 312, radio tuning 314, Engine Indicating and Crew Alert System (EICAS) 316, checklist 318, and synoptics information 320. Avatars can display scaled versions of their representative formats in real-time, or live. Avatars 302-322 are shown with titles for clarity; however, in use, avatars 302-322 may or may not include titles. Avatars 302-322 are further shown with black lines which indicate text, which may or may not be legible based on the scaling of the avatar.

According to one embodiment, the full format representation may include layers which the avatar may scale different rates. For example, referring to weather map avatar 322, a weather information layer 322a may scale down at a first rate; however, a weather warning layer 322b may scale at a second rate, remaining larger in order to attract attention. According to another embodiment, the avatar may display a subset of information, for example, a checklist may contain a plurality of details on the forward flight display; however, checklist avatar 318 may only contain headings or less detailed information in avatar format. The checklist may still be updated in real time, for example, headings may change color in response to portions of the checklist been completed. According to another embodiment, a synoptic avatar 320 may display prominent green flag 320a of all systems are fine, but a yellow or red flag indicative of a status message, for example, it the cabin pressure or temperature nears or exceeds operating limits, respectively.

Avatars may be interacted with via touchscreen 130 or cursor control devices 132. As shown, checklist avatar 318 shows user interaction via a cursor control device. Alternatively, the desired heading may be selected by a touchscreen gesture, e.g., tapping or double-tapping. According to another embodiment, touchscreen interaction with the display system may include actuating pulldown menus (e.g., pulldown menus 318a and 318b in checklist avatar 318) via finger in lieu of a cursor. In one embodiment, providing a gesture in relation to in avatar may cause the avatar to fill the entire display. In response other avatars may fade into the background, may be overridden, may be reduced in size to a portion of the display, or converted into icons.

Returning to the embodiment shown in FIG. 2A, dragging an icon or an avatar onto a forward display location causes the information represented by the icon or avatar to be displayed on the respective forward display, e.g., PFD location 222a or 222b or an MFD location 224a or 224b. Similarly, dragging from a PFD location 222, MFD location 224, or avatar location 212 to an icon location 210 causes the lives information displayed on the forward display or as an avatar to become symbolically represented as an icon located in the selected icon location 210. Dragging from an icon location 210 to in avatar location 212 causes the information symbolically represented by the icon to become scaled representation of the live data displayed in the selected avatar location. According to various embodiments, dragging from MFD location 222 or PFD location 224 to in avatar location 212 may cause the full format image on the forward display to become an avatar located in avatar location 212 or to simultaneously display (e.g., echo) the live information both on PFD 122 or MFD 124 and in avatar location 212.

According to alternate embodiments, gestures other than dragging may be performed on the icons, avatars, icons locations 210, and avatar locations 212, for example tapping, flicking, stretching, etc. For example, tapping, double tapping, or flicking an avatar or avatar location 212 may cause the live information represented by the avatar to be displayed as a full format on a forward display. According to other embodiments, the avatar or icon are not displayed in the selected location (e.g., drag-to location), but are instead displayed in the next available location. For example, if an icon is dragged to an occupied avatar location 212a, the live data is displayed as an avatar in avatar location 212b. Similarly, if icon location 210a is occupied, the generated icon may be displayed in icon location 210b, etc.

According to the embodiment shown in FIG. 2B, touchscreen 130 may not include PFD location 222 or MFD locations 224. For example, according to the embodiment shown in FIG. 2B, touchscreen 130 includes an icon region 230 and an avatar region 240. Dragging an avatar from avatar region 240 into icon region 230 may convert the selected avatar into an icon, i.e., convert the presentation of information from a scaled live representation to a symbolic representation, and place the icon in the next available icon location 210. Similarly, dragging an icon from icon region 230 to avatar region 240 may convert the icon into an avatar, causing the information symbolically represented by the icon to be displayed as scaled live data in avatar region 240. Performing a gesture on an icon located in icon region 230 may cause the live data represented by the icon to be displayed on PFD 122 or MFD 124. According to one embodiment, flicking an icon in a particular direction or towards the desired PFD 122 or MFD 124 causes the symbolically represented information to be displayed as live information on PFD 122 or MFD 124. According to another embodiment, dragging an icon from icon region 230 to an edge of touchscreen 130 causes the live information symbolically represented by the icon to be displayed on PFD 122 or MFD 124.

According to one embodiment, avatars in avatar region 240 may change size and location in response to a user input. For example, a pinching gesture may cause an avatar to decrease in size, a stretching gesture may cause an avatar to increase in size, and dragging may cause the avatar to change locations. According to another embodiment, avatar displayed in avatar region 240 may also be displayed, or echoed, on another display, e.g., on a PFD 122 or MFD 124. For example, an avatar in avatar region 240 may display a scaled representation of the full format image on PFD 222. Interaction with the avatar on touchscreen 130 causes a corresponding response to be displayed on PFD 122 or MFD 124. According to one embodiment, performing a gesture on an avatar representing an artificial horizon may add synthetic vision system information to the artificial horizon on PFD 122. According to another embodiment, overlaying a weather radar avatar on a chart avatar may cause a chart displayed on an MFD 124 to also display weather information, e.g., geographically aligned weather information.

Referring to FIG. 2C, the embodiment of FIG. 2B is illustrated as it would appear in use, according to an exemplary embodiment. Checklist avatar 318 and synoptics avatar 320 are shown in avatar region 240. Icon region 230 is shown populated with a plurality of icons. A sun-and-cloud icon, which symbolically represents weather data, is shown in icon location 210a. A silhouette of an aircraft representing synoptics data, a check representing checklist data, and the words "NAV MAP" representing navigational map data are shown in icon locations 210b-210d. A gear icon symbolically representing aircraft systems in location 210e has become an oil can to represent a notification regarding the hydraulic system. This notification icon may change colors, flash, and/or be accompanied by audible or haptic alerts.

According to one embodiment, a first gesture may be made in relation to an icon symbolic of aircraft synoptics, for example, a gear, a silhouette of an aircraft, or simply the word "Synoptics". The first gesture, such as tapping or dragging the icon into avatar region 240 may cause the icon to convert into an avatar. The avatar may then display live synoptics information and may include interactive items. For example, synoptics avatar 320 displays an outline of the fuselage and cabin pressure, temperature, and oxygen levels at various locations within the fuselage. Performing a gesture in relation to one of those readings may cause more detailed information to be displayed, for example, double-tapping the aft temperatures may cause a flight-history trace of the aft temperatures and pressures to be displaced. Another gesture, for example a swipe, may cause the synoptics avatar 320 to return to a less detailed aircraft view, as shown. Other synoptics may be accessed via interaction with pulldown menu 320a.

According to another embodiment, a first gesture may be made in relation to an icon symbolic of a navigation map. For example, the symbolic representation maybe a generic map emblem, a compass arrow, or simply the words "Nav Map". The first gesture may cause the icon to convert into an avatar on the same display or on a second display. The avatar may then display live navigational map information and may include interactive items. For example, the map information displayed may update in relation to movement of the aircraft. Interactive items may include images representing navigational beacons. Gestures in relation to a navigational beacon image may cause more information about the navigational beacon to be displayed. Additional gestures (e.g., pinch, stretch, drag, two-finger drag, swipe, etc.) may cause the avatar to increase or decrease in size to change the information displayed (e.g., location displayed on the map).

Figure 4:
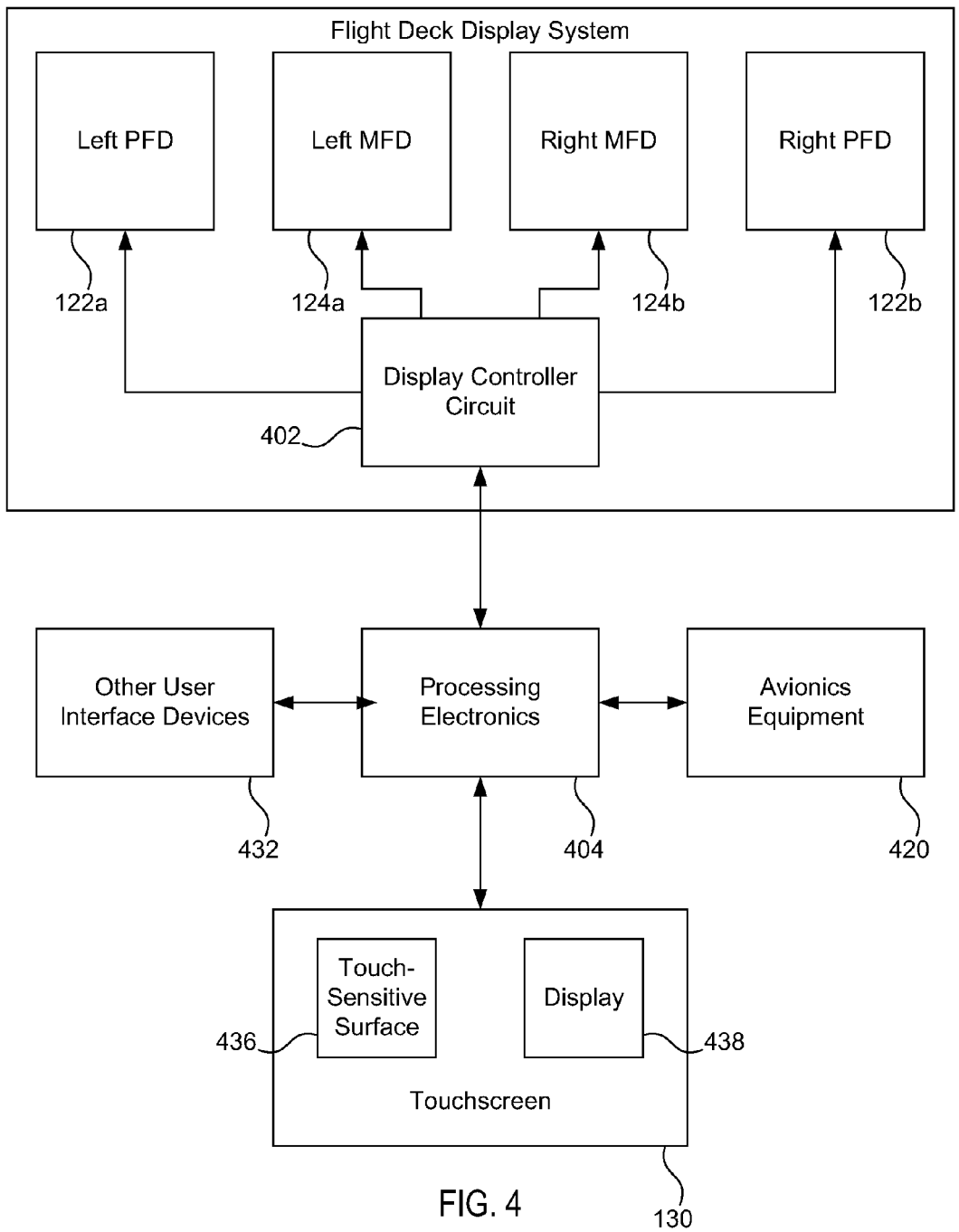
FIG. 4 is a general schematic block diagram of an aviation display control system, according to an exemplary embodiment.

Referring to FIG. 4, a block diagram of the aviation display control system is shown according to an exemplary embodiment. As shown, the aviation display control system includes a flight deck display system 400 and a touchscreen 130 coupled to processing electronics 404. Touchscreen 130 may include a touch-sensitive surface 436 coupled to a display 438. According to one embodiment, touch-sensitive surface 436 overlays display 438. Flight deck display system 400 may include one or more flight deck displays (e.g., PFD 122, MFD 124, etc.) connected (e.g., directly, indirectly) to an display controller circuit 402. Display controller circuit 402 may include any number of mechanical or electrical circuitry components or modules for causing the flight deck displays to display images. For example, circuit 402 may be configured to display images on left PFD 122a and right PFD 122b and display different images on each of left MFD 124a, and right MFD 124b. In other embodiments, circuit 402 may be configured to swap or exchange the images displayed on forward displays. In another embodiment, flight deck display system 400 includes other displays on the flight deck, for example, display 438 of touchscreen 130 or an electronic flight bag and may be configured to swap or exchange images between touchscreen display 438 and PFD 122 or MFD 124. In yet other embodiments, flight deck display system 400 may include touch-sensitive surface 436, in which case circuit 402 may provide touch input to processing electronics 404. For example, PFD 122 or MFD 124 may be a touchscreen.

Processing electronics 404 can also be configured to provide control signals or control logic to circuit 402. For example, depending on pilot or situational inputs, processing electronics 404 may be configured to cause circuit 402 to change behavior. In other words, processing electronics 404 may include the processing logic for flight deck display system 400. Processing electronics 404 can also be configured to output indications, notifications, alerts, warnings, etc., to PFD 122 or MFD 124.

Processing electronics 404 may be coupled to other user interface devices 432, such as cursor control devices 132 or an electroacoustic transducer configured to receive audio input. The other user interface devices 432 may include or operate as redundant input systems.

Processing electronics 404 are further shown as connected to avionics equipment 420 which may generally include any number of sensors, systems, or subsystems configured to provide data to processing electronics 404. For example, avionics equipment 420 could include temperature sensors, humidity sensors, infrared sensors, altitude sensors, pressure sensors, airspeed sensors, ground speed sensors, pitot-static tubes, a gyroscope, a global positioning system (GPS), or any other aircraft-mounted sensors that may be used to provide data to processing electronics 404. It should be appreciated that avionics equipment 420 (or any other component shown connected to processing electronics 404) may be indirectly or directly connected to the processing electronics 404. Avionics equipment 420 may be or include a flight management system, a navigation system, a backup navigation system, or another aircraft system configured to provide inputs to processing electronics 404. For example, avionics equipment 420 may provide controls inputs, such as throttle or power level.

Figure 5:
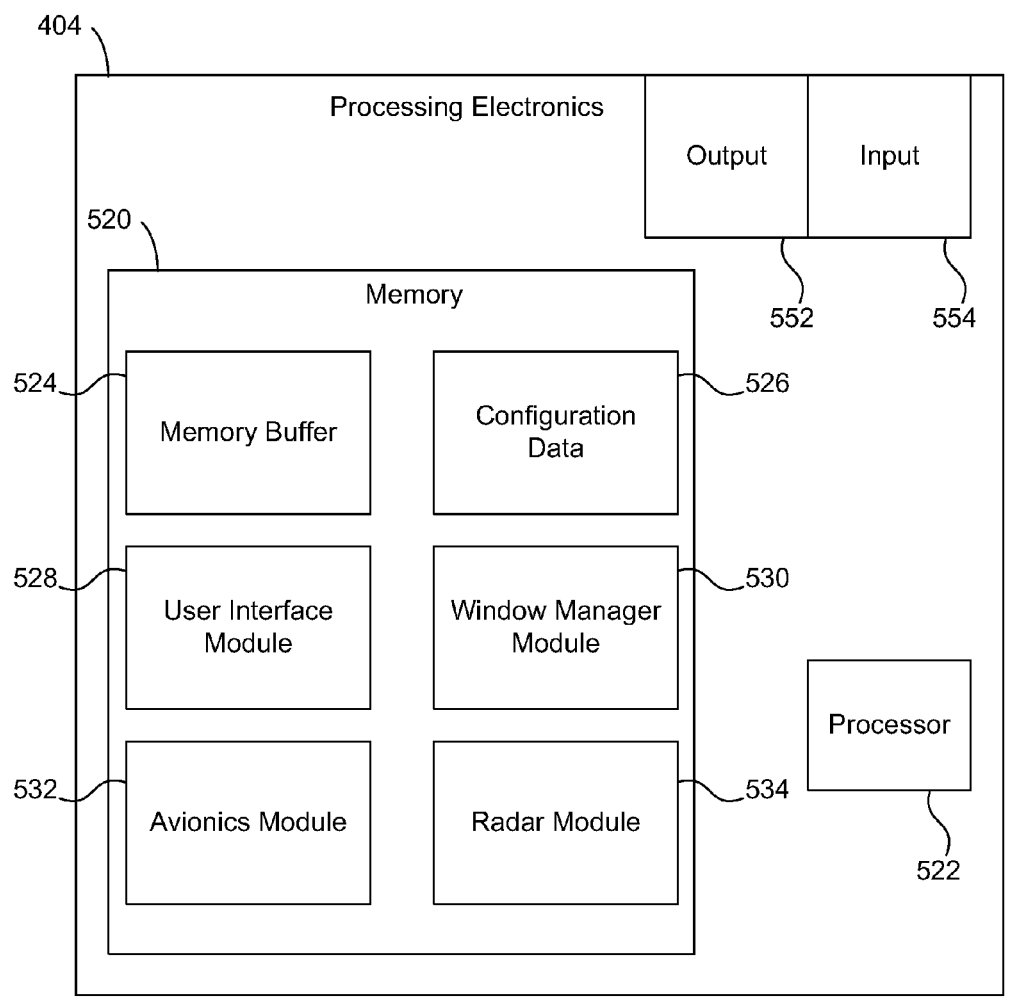
FIG. 5 is a general schematic block diagram of the processing electronics of the aviation display control system of FIG. 4, according to an exemplary embodiment.

Referring to FIG. 5, a detailed block diagram of processing electronics 404 of FIG. 4 is shown, according to an exemplary embodiment. Processing electronics 404 includes a memory 520 and processor 522. Processor 522 may be or include one or more microprocessors, an application specific integrated circuit (ASIC), a circuit containing one or more processing components, a group of distributed processing components, circuitry for supporting a microprocessor, or other hardware configured for processing. According to an exemplary embodiment, processor 522 is configured to execute computer code stored in memory 520 to complete and facilitate the activities described herein. Memory 520 can be any volatile or non-volatile memory device capable of storing data or computer code relating to the activities described herein. For example, memory 520 is shown to include modules 528-534 which are computer code modules (e.g., executable code, object code, source code, script code, machine code, etc.) configured for execution by processor 522. When executed by processor 522, processing electronics 404 is configured to complete the activities described herein. Processing electronics includes hardware circuitry for supporting the execution of the computer code of modules 528-534. For example, processing electronics 404 includes hardware interfaces (e.g., output 552) for communicating control signals (e.g., analog, digital) from processing electronics 404 to circuit 402. Processing electronics 404 may also include an input 554 for receiving, for example, display data from circuit 402, user input from touchscreen 130, flight data from avionics equipment 420, or for receiving data or signals from other systems or devices.

Memory 520 includes a memory buffer 524 for receiving radar return data, avionics data, and user input data. The data may be stored in memory buffer 524 until buffer 524 is accessed for data. For example, user interface module 528, window manager module 530, radar module 534, or another process that utilizes user input data may access buffer 524. The user input data stored in memory 520 may be stored according to a variety of schemes or formats. For example, the user input data may be stored in an x,y or x,y,z format, gesture-centric, or any other suitable format for storing spatial-relative information.

Memory 520 further includes configuration data 526. Configuration data 526 includes data relating to flight deck display system 400 and touchscreen 130. For example, configuration data 526 may include display operational data which may be data that window manager module 530 can interpret to determine how to command circuit 402 to operate a PFD 122, MFD 124, touchscreen display 438, or other flight deck display. For example, configuration data 526 may include information regarding size, resolution, refresh rates, orientation, location, spatial relationships between touchscreen 130 and the forward displays, and the like. Configuration data 526 may include information touchscreen operational data which may be data that user interface module 528 can use to interpret user input data from memory buffer 524 or touch sensitive surface 436. For example, configuration data 526 may include information regarding the size, resolution, sensitivity, and the like.

Memory 520 further includes a user interface module 528, which includes logic for using user input data in memory buffer 524 to determine desired user responses. User interface module may be configured to interpret user input data to determine various gestures (e.g., drag versus swipe versus tap), the direction of gestures, and the relationship of these gestures to icons, icon locations 210, icon regions 230, avatars, avatar locations 212, or avatar regions 240. User interface module 528 may include logic to provide input confirmation and to prevent unintended input. For example, logic to activate single-finger touch only at the moment and location the finger is lifted. This allows the crew to use the touch surface to stabilize their hand, thereby adding more accuracy to the command than if it activated at the time or location the finger contacted the surface. For example, formats, avatars, icons, virtual controls, and other objects may use visual, audible, and tactile feedback to indicate selection. Color halos, object color, or other style changes, audible tones, or voice repetition of input commands, and/or tactile feedback can be useful in making the crew more aware of touch input.

Memory 520 further includes a window manager module 530, which may include logic for causing a display to provide an icon, avatar, or full format image. Window manager module may receive input from user interface module 528, avionics module 532, radar module 534, or other modules. According to various embodiments, window manager module 530 may include logic to scale layers of an avatar at different rates, to move representations of data among screens, to swap displayed images, and to display real-time or live data as it is updated.

Memory 520 is further shown to include avionics module 532, which may include logic for receiving and interpreting sensor readings and controls inputs (e.g., throttle position, flaps position, etc.). Avionics module 532 may include logic for exchanging information between aircraft systems and subsystems. For example, avionics module 532 may receive sensor readings from a sensor and provide sensor data to window manager module 530 to be displayed on PFD 122. Avionics module 532 may include logic for, or communicate with other modules that are configured for communications, navigation, flight control systems, weather, etc. For example, avionics module 532 may receive radar return data from radar module 534 or memory buffer 524.

Memory 520 is further shown to include radar module 534. Radar module 534 may be an algorithm for commanding circuit 402 to sweep a radar beam. Radar module 534 may be used, for example, to send one or more analog or digital control signals to the radar control circuit. The control signals may be, for example, an instruction to move the antenna mechanically, an instruction to conduct an electronic beam sweep in a certain way, an instruction to move the radar beam to the left by five degrees, etc. Radar module 534 may be configured to control timing of the beam sweeps or movements relative to aircraft speed, flight path information, transmission or reception characteristics from the weather radar system or otherwise. Radar module 534 may receive data from configuration data 526 for configuring the movement of the radar beam.

Figure 6:
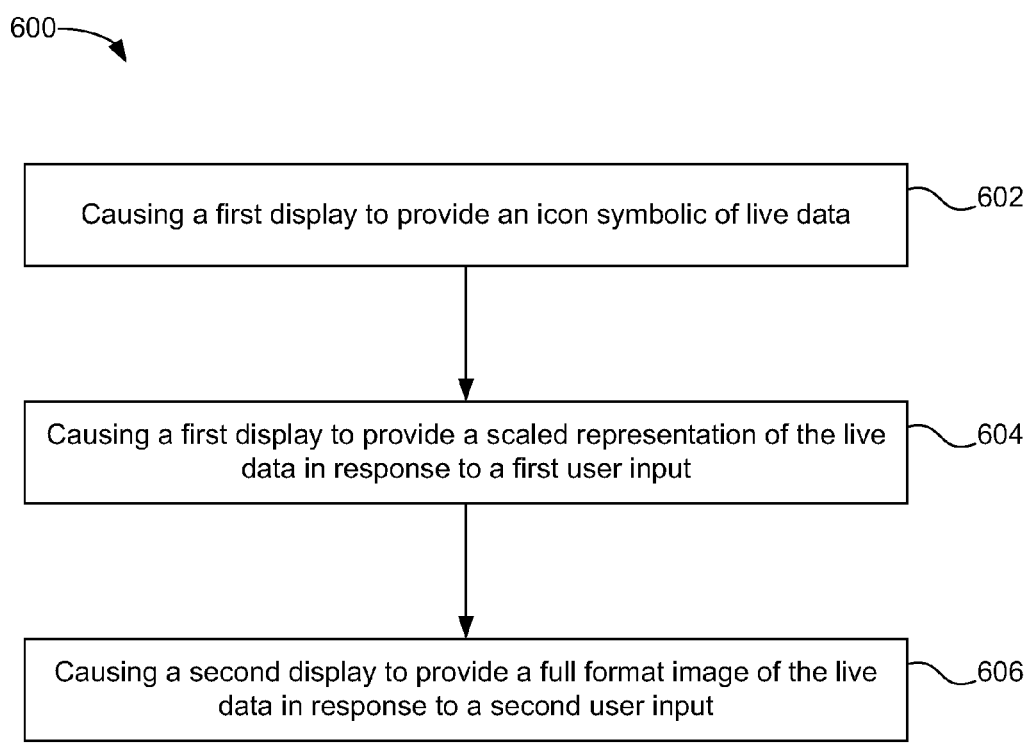
FIG. 6 is a schematic flow chart of a process for controlling an aviation display, according to an exemplary embodiment.

Referring to FIG. 6, a flowchart of process 600 for controlling an aviation display is shown according to an exemplary embodiment. Process 600 is shown to include the steps of causing a first display to provide an icon symbolic of live data (step 602), causing a first display to provide a scaled representation of the live data in response to a first user input (step 604), and causing a second display to provide a full format image of the live data in response to a second user input (step 606).

Figure 7:
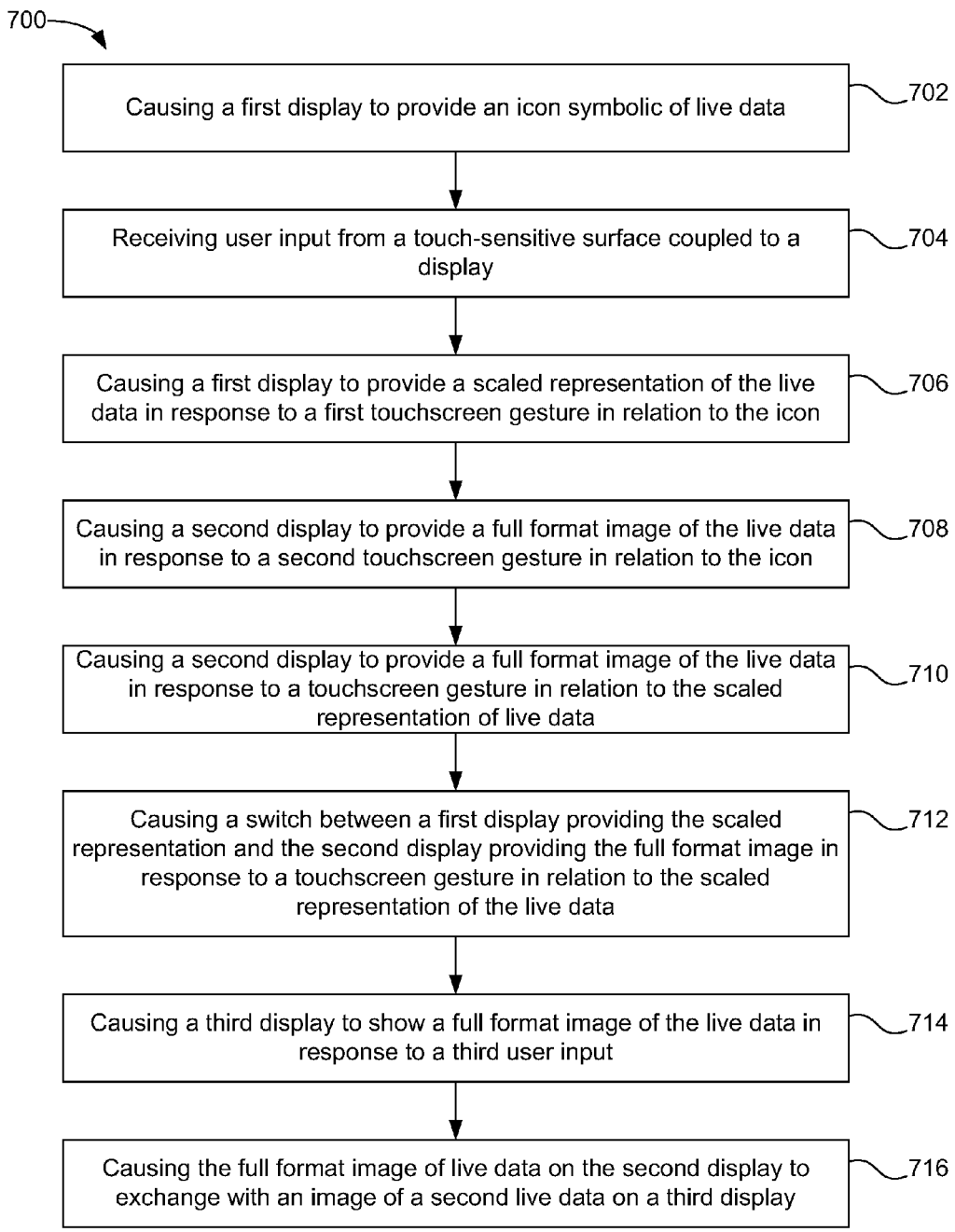
FIG. 7 is a schematic flow chart of a process for controlling an aviation display, according to another exemplary embodiment.

Referring to FIG. 7, a flowchart of process 700 for controlling an aviation display is shown according to an exemplary embodiment. Process 700 is shown to include the steps of causing a first display to provide an icon symbolic of live data (step 702) and receiving user input from a touch-sensitive surface coupled to a display (step 704). According to various embodiments, the user input from the touch-sensitive surface may be any suitable gesture (e.g., tap, touch, swipe, drag, flick, pinch, stretch, multiple-finger swipe, etc.). Process 700 is shown to further include the steps of causing a first display to provide a scaled representation of the live data in response to a first touchscreen gesture in relation to the icon (step 706) and causing a second display to provide a full format image of the live data in response to a second touchscreen gesture in relation to the icon (step 708). According to various embodiments, the first touchscreen gesture and the second touchscreen gesture may be the same, different, or repeated gestures. According to one embodiment, the first touchscreen gesture is a single tap, and a second touchscreen gesture is a double tap. According to various embodiments, the first touchscreen gesture may include swiping from an icon location 210 to an avatar location 212, dragging an icon from an icon location 210 to in avatar location 212, etc, on touchscreen 130. According to various other embodiments, the second touchscreen gesture may include swiping from an icon location 210 to a PFD location 222 or an MFD location 224, dragging an icon from an icon location 210 to a PFD location 222 or MFD location 224, flicking from an icon location 210 in a direction indicative of the desired PFD 122 or MFD 124, or flicking from an icon location 210 towards the location of the desired PFD 122 or MFD 124 on the flight deck.

Process 700 is further shown to include the steps of causing a second display to provide a full format image of the live data in response to a touchscreen gesture in relation to the scaled representation of the live data (step 710) and causing a switch between a first display providing the scaled representation and the second display providing the full format image in response to a touchscreen gesture in relation to the scaled representation of the live data (step 712). According to various embodiments, the gesture in relation to the scaled representation of the live data may include dragging or swiping from an avatar location 212 to a PFD location 222 or MFD location 224 on touchscreen 130, tapping or double tapping an avatar, or flicking from an avatar location 212 or avatar region 240 in a direction indicative of the desired PFD 122 or MFD 124 (e.g., predetermined edge or corner of touchscreen 130) or towards the location of the desired PFD 122 or MFD 124 on the flight deck. According to one embodiment, performing a gesture in relation to an avatar on touchscreen 130 (e.g., twisting, flicking, etc.) may cause the corresponding first live data to become displayed as a full format image on PFD 122 or MFD 124, and the second live data displayed as the full format image on PFD 122 or MFD 124 becomes displayed as an avatar on touchscreen 130.

Process 700 is further shown to include the steps of causing a third display to show a full format image of the live data in response to a third user input (step 714) and causing the full format image of live data on the second display to exchange with an image of a second live data on a third display. The third user input may be the same or different than the first and/or second user inputs. As described above for step 710, a variety of gestures in relation to an icon or avatar may cause left PFD 122a, left MFD 124a, right MFD 124b, and/or right PFD 122b to display full format image of live data. Various gestures described above may also be used to swap or exchange the information displayed on various flight deck displays. According to one embodiment, left seat (e.g., pilot's seat) and right seat (e.g., copilot's seat) can have all of their display formats swapped by sliding and intuitive icon across the touchscreen 130. For example, sliding an image of a pilot's cap from a first position to a second position may cause the information displayed on left PFD 122a and left MFD 124a to exchange places with the information displayed on right PFD 122b and right MFD 124b, respectively. Allowing easy switching of displays allows different crew members to take control of the aircraft, for example, during rest breaks or emergencies. Further, this may allow a copilot to prepare displays in advance and place them in front of the pilot at an appropriate time, for example, preparing an airport map prior to landing or preparing weather and navigation maps prior to takeoff.

Figure 8:
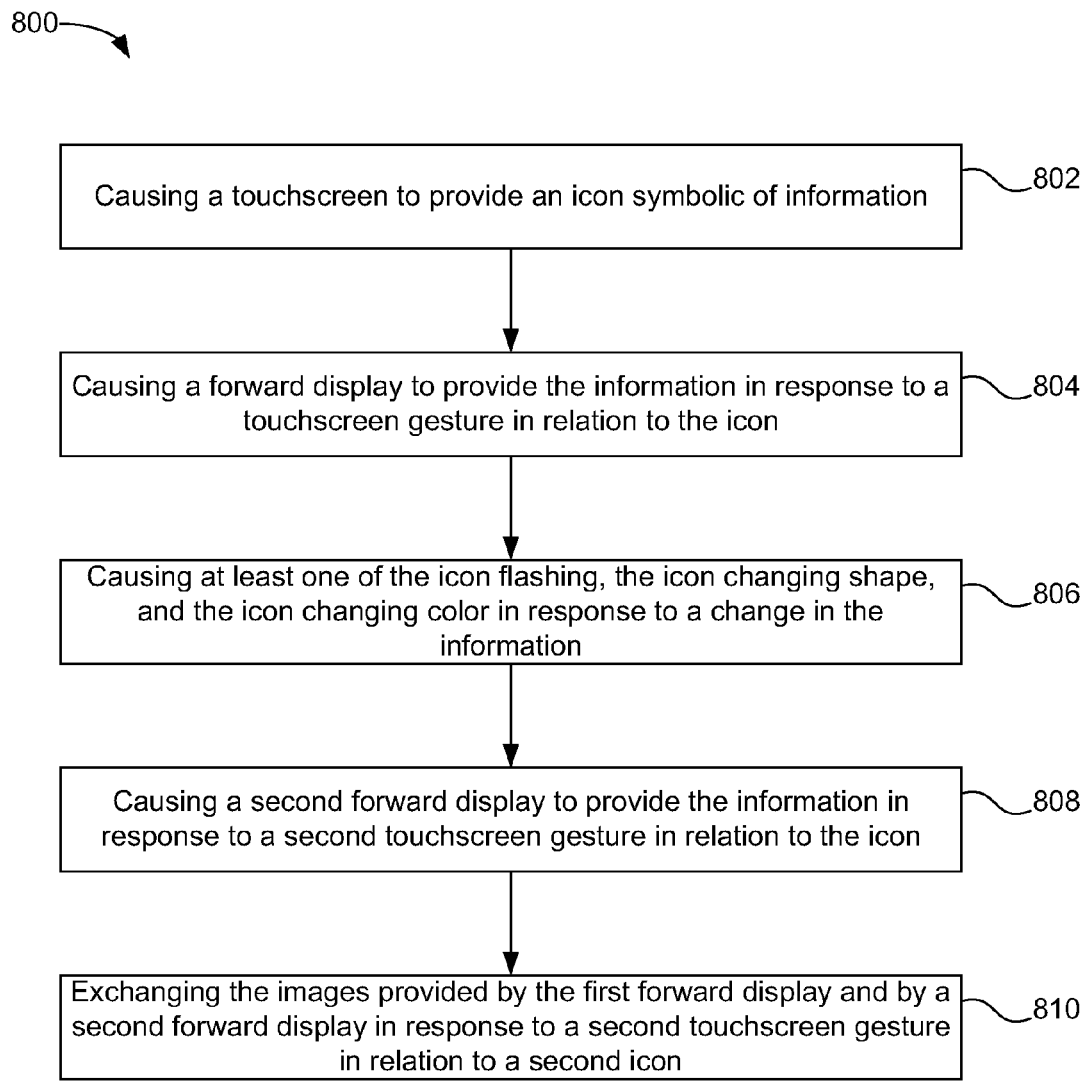
FIG. 8 is a schematic flow chart of a process for controlling an aviation display system including a touchscreen and a forward display, according to another exemplary embodiment.

Referring to FIG. 8, a flowchart of process 800 for controlling an aviation display system including a touchscreen and a forward display is shown according to an exemplary embodiment. Process 800 is shown to include the steps of causing a touchscreen to provide an icon symbolic of information (step 802) and causing a forward display to provide the information in response to a touchscreen gesture in relation to the icon (step 804). According to one embodiment, applying a gesture in relation to an icon (e.g., flicking the icon, tapping the icon, flicking the icon towards a desired forward display, etc.) may cause the live data represented by the icon to be displayed on PFD 122 or MFD 124.

Process 800 is further shown to include the step of causing at least one of the icon flashing, the icon changing shape, and the icon changing color in response to a change in the information (step 806). For example, the silhouette of an aircraft icon may become a flashing red thermometer in response to an engine overheating or may become a yellow oil can in response to hydraulic pressure approaching an operating limit.

Process 800 is further shown to include the steps of causing a second forward display to provide the information in response to a second touchscreen gesture in relation to the icon (step 808) and exchanging the images provided by the first forward display and by a second forward display in response to a second touchscreen gesture in relation to a second icon (step 810). According to one embodiment, applying a gesture in relation to the icon (e.g., flicking the icon, tapping the icon, flicking the icon towards a desired forward display, etc.) may cause the live data represented by the icon to be displayed on a second PFD 122 or MFD 124. The live data may be represented instead of on the first display or in addition to the first display. For example, on landing, the copilot may place a map of the airport on both left PFD 122a and right PFD 122b. According to another embodiment, left seat (e.g., pilot's seat) and right seat (e.g., copilot's seat) can have all of their display formats swapped by performing a second gesture in relation to an icon of a pilot's cap. For example, sliding an image of a pilot's cap from a first position to a second position may cause the information displayed on left PFD 122a and left MFD 124a to exchange places with the information displayed on right PFD 122b and right MFD 124b, respectively. Allowing easy switching of displays allows different crew members to take control of the aircraft, for example, during rest breaks or emergencies. Alternatively, the second gesture may be in relation to an icon representing the second display. For example, swiping from an icon representing left PFD 122a to and icon representing right MFD 124b causes the images provided on those displays to be exchanged.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. An apparatus for controlling an aviation display comprising:
   processing electronics configured to:
      cause the aviation display to provide an icon, a first format for aviation data, and a second format for aviation data, wherein the icon is a symbolic representation of the aviation data, and wherein the first format includes a full format image of a first live data and the second format includes a scaled representation of a second live data;
      process a first touchscreen gesture on the scaled representation of the second live data shown in the second format to cause the second live data to be provided in the first format and the first live data to be provided in the second format; and
      process a second touchscreen gesture to cause the aviation display to switch between providing the aviation data in at least one of the icon, the full format image of the first live data, and a scaled representation of the first live data.

2. The apparatus of claim 1, wherein the processing electronics are configured to receive user input from at least one button disposed on a bezel of the touchscreen.

3. The apparatus of claim 1, wherein the first format comprises a first layer and a second layer, the processing electronics being configured to scale the first layer at a different rate than the second layer when the first live data is switched between the first format and the second format.

4. The apparatus of claim 1, wherein the second format comprises a subset of the information of the first format.

5. The apparatus of claim 1, wherein the processing electronics are configured to process a second touchscreen gesture in relation to the second format to change a area in which the scaled representation is displayed.

6. The apparatus of claim 5, wherein the processing electronics cause the aviation display to revert to a default layout in response to a third user input.

7. A method of controlling an aviation display, the method comprising:
   causing a first display to provide an icon symbolic of live data;
   processing a first user input, in relation to the icon, from a touch-sensitive surface coupled to the first display to cause the first display to provide a scaled representation of the live data; and
   processing a second user input, in relation to the scaled representation of the live data, from the touch-sensitive surface coupled to the first display to cause a second display to provide a full format image of the live data.

8. The method of claim 7, wherein the first user input comprises a touchscreen gesture in relation to the icon.

9. The method of claim 7, wherein the second user input comprises a touchscreen gesture in relation to the scaled representation of the live data.

10. The method of claim 7 further comprising processing a third user input to cause a switch between the first display providing the scaled representation of the live data and the second display providing a full format image of a second live data, the third user input comprising a touchscreen gesture in relation to the scaled representation of the live data.

11. The method of claim 7 further comprising causing a third display to show a full format image of the live data in response to a third user input.

12. The method of claim 7 further comprising processing a third user input from the touch-sensitive surface coupled to the first display to cause the full format image of live data on the second display to exchange with an image of a second live data provided on a third display.

13. A method of controlling an aviation display system including a touchscreen and a forward display, the method comprising:
   causing the touchscreen to provide an icon symbolic of information;
   causing the forward display to provide the information in response to a first touchscreen gesture in relation to the icon; and
   exchanging, in response to a second touchscreen gesture in relation to a second icon, the image of the information provided by the first forward display and a second image of a second information provided by a second forward display.

14. The method of claim 13 further comprising causing at least one of the icon flashing, the icon changing shape, and the icon changing color in response to a change in the information.

15. The method of claim 13 further comprising causing a second forward display to provide the information in response to a second touchscreen gesture in relation to the icon, the second forward display spaced apart from the forward display and the touchscreen.

16. The method of claim 7, wherein the first display is spaced apart from the second display.

17. The method of claim 11, wherein the second display is spaced apart from the third display.

18. The apparatus of claim 6, wherein the third user input comprises input from at least one button disposed on a bezel of the touchscreen.

19. The method of claim 13, wherein the forward display is spaced apart from the touchscreen.

\* \* \* \* \*